US009805557B2

(12) United States Patent
Schmidt et al.

(10) Patent No.: US 9,805,557 B2
(45) Date of Patent: Oct. 31, 2017

(54) APPARATUS AND METHOD FOR A GAME WITH EXPANDING SYMBOL MATRIX

(71) Applicant: Novomatic AG, Gumpoldskirchen (AT)

(72) Inventors: Heike Schmidt, Vienna (AT); Daniel Huppert, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 38 days.

(21) Appl. No.: 14/989,001

(22) Filed: Jan. 6, 2016

(65) Prior Publication Data

US 2017/0193756 A1 Jul. 6, 2017

(51) Int. Cl.

*G06F 17/00* (2006.01)
*G07F 17/34* (2006.01)
*G07F 17/32* (2006.01)

(52) U.S. Cl.

CPC .......... *G07F 17/34* (2013.01); *G07F 17/3211* (2013.01); *G07F 17/3262* (2013.01)

(58) Field of Classification Search

USPC ........................................................ 463/16–25
See application file for complete search history.

(56) References Cited

U.S. PATENT DOCUMENTS

2011/0201406 A1* 8/2011 Jaffe ........................ G07F 17/32 463/21
2016/0314661 A1* 10/2016 Vann ........................ G07F 17/34
2017/0092043 A1* 3/2017 Shiraishi ................. G07F 17/32
2017/0092073 A1* 3/2017 Nakamura .......... G07F 17/3267

* cited by examiner

*Primary Examiner* — Ronald Laneau
(74) *Attorney, Agent, or Firm* — Fincham Downs, LLC; Magdalena M. Fincham, Esq.

(57) ABSTRACT

The present invention relates to an electronic gaming machine and method for a game of play for use in a gaming establishment, or on a general purpose computing device for offering games with multiple outcomes. The outcome of game play is displayed as a symbol matrix on a display device. The symbol matrix has a predetermined number of rows and columns, wherein symbols are randomly arranged in the symbol matrix. In response to detecting a trigger event, a range for matrix expansion is randomly defined or selected from a number of possible ranges for matrix expansion. An expanded symbol matrix is created and displayed, wherein the range for matrix expansion is indicated in the expanded symbol matrix. Then an active symbol area is determined for at least one consecutive game play, which usually is larger than the symbol matrix and which may be changed dynamically for each game play the feature is triggered.

18 Claims, 7 Drawing Sheets

APPARATUS AND METHOD FOR A GAME WITH EXPANDING SYMBOL MATRIX

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

FIELD OF THE INVENTION

The present invention relates generally to gaming machines and methods through which players may initiate game plays and participate in wagering games. More particularly this invention relates to methods for conducting game plays using a symbol matrix, where the number of symbol positions of the symbol matrix is dynamically expanded.

BACKGROUND OF THE INVENTION

In the gaming industry, gaming machines, especially electronic gaming machines, such as slot machines, video poker machines and the like, have been an important basis. Gaming machines offer a variety of games such as slot games, video poker games, roulette games and many other types of wagering games. The games are commonly deployed on electronic gaming machines ("EGMs") at a casino or other gaming establishment for use by players, but they may also be deployed on server-based gaming systems or on a general purpose computing devices or mobile phones in stand-alone form or as online games, which is a video game that is either partially or primarily played across a network such as the Internet or another computer network.

Playing such a game (e.g. slot game, video poker game, roulette game, etc.) typically requires placing a wager on the outcome of the game. The games are programmed with a predefined set of outcomes including one or more winning outcomes and one or more losing outcomes. The player is typically awarded for a winning outcome and receives no award for a losing outcome.

A win on a slot game usually involves matching symbols, either on mechanical reels that spin and stop to reveal one or several symbols, or on simulated reels shown on a display device (e.g. video screen, etc.). The reels—either mechanical or simulated—form a matrix with a predetermined number of rows and columns, wherein the number of columns corresponds to the number of reels. Most games have a variety of winning combinations of symbols, often posted on the face of the gaming machine. The outcome of game play is randomly determined—nowadays usually with the help of a random number generator and by a processor or control unit integrated in the EGM. Then, the outcome is displayed in the form of a symbol matrix, wherein the symbols are randomly selected at each position in the symbol matrix, and if a winning combination results within the symbol matrix according to the rules of the game, the EGM provides the player with an award (e.g. credit, points, cash, extra games, etc.).

Generally, the popularity of EGM games depends on the player's expectation of achieving a winning outcome, and on the entertainment value of a particular game compared to other available gaming options. If there are different EGMs available and the expectation of winning at each EGM is roughly the same, players will be attracted to the most exciting and entertaining games. That being the case, there is a continuing need for EGMs providing new and exciting games, or new types of games in the gaming industry which will attract frequent game play by enhancing the entertainment value and the excitement associated with the game.

Various EGMs use methods of expanding the symbol matrix by e.g. adding columns (reels) or rows to increase game variation and player excitement. One example of such a game is disclosed in US 2005/0159208 A1 to Pacey. Pacey discloses an EGM using an expandable symbol array to create a series of sequentially larger symbol arrays with the potential of additional or enhanced awards. The expanded symbol array is created by addition of one or more reels to the base array. The expanded symbol array may be generated only under special circumstances that occur in the base symbol array. In response to the occurrence of these circumstances, at least an additional reel is added to the base symbol array producing a larger symbol array.

US 2013/0065663 A1 to Johnson et al., discloses a slot machine game with expanding positions. The slot machine game of Johnson increases the size of the symbol array as a mystery feature. As the reels are spinning, the number of positions available on each reel grows randomly to allow more paylines. The symbol array is expanded using a mystery feature that adds one or more rows to the symbol array.

Although many existing games entertain and excite players, there is always a need for better and more interesting games and features which provide the players with an ever-increasing level of excitement. Such added excitement may be provided by a dynamic variation of the size of the symbol matrix and thus a varied number of paylines in different game plays.

SUMMARY OF INVENTION

The present invention defines an apparatus and a method that adds excitement and a new, innovative form of entertainment to the play of wagering games on EGMs. It does so by offering a highly entertaining game feature that thrills the player, and which may be implemented in a base game and/or a bonus game. Like other games played on an EGM, the player places an initial wager to play. After initiating a game play via an input device, the EGM's control unit—usually using a random number generator ("RNG")—generates an outcome. That outcome is displayed on the display of the EGM to the player. Usually, the outcome is displayed in the form of a symbol matrix with a number of rows and columns and having a plurality of symbol positions. The present invention may be implemented in a base game, a sub-game, a bonus or a free game after detecting a trigger event (e.g. during the process of the current game play or in the outcome of the game play).

According to one aspect of the present invention, an EGM at least includes a display device for displaying game plays including game outcomes, an input device configured to receive input from a player to initiate game plays and a control unit in operative communication with the display device and the input device. The control unit also controls game play to provide a plurality of symbols which are positioned in a symbol matrix with a number of rows and columns, wherein the columns may represent the reels. The control unit is configured to initiate a game play in response to an input entered via the input device by a player and to determine randomly, or by using an RNG, an outcome of the game play. The control unit is further configured to direct the display device to display the outcome of the game play in the symbol matrix, wherein the symbols are randomly arranged within the symbol matrix.

In response to a trigger event being detected by the control unit, the control unit is further configured to randomly define a range for matrix expansion of the symbol matrix. The respective range may be defined by the RNG which selects the respective range e.g. from a plurality of predetermined ranges for matrix expansion—lying within predetermined maximum limits for matrix expansion. The control unit is further configured to create an expanded symbol matrix. The expanded symbol matrix may be a combination of the symbol matrix and a maximum possible matrix expansion. In another embodiment the expanded symbol matrix may consist of the symbol matrix expanded by the defined or selected range for matrix expansion. In the expanded symbol matrix the defined or selected range for matrix expansion is indicated. The control unit is further configured to randomly determine an active symbol matrix area (e.g. with the help of the RNG). The active symbol matrix area is used for at least one consecutive game play. The upper limit of the active symbol matrix lies within the defined or selected range of matrix expansion—i.e. the smallest possible active symbol matrix area does not fall below the lower limit of the defined or selected range of matrix expansion and the largest possible active symbol matrix area does not exceed, but only equals the upper limit of the defined or selected range of matrix expansion.

Another version of the present invention is a method of playing a game on a EGM having a display device, an input device, which is configured to receive input from a player to initiate game plays, and a control unit in operative communication with the display and the input device. The control unit is further configured to control game plays to provide a plurality of symbols positioned in a symbol matrix with a number of rows and columns. The method includes initiating a game play in response to an input of a player via the input device and then determining randomly an outcome of the game play—usually with the help of an RNG and controlled by the control unit. The method further includes displaying the outcome of the game play in the symbol matrix on the display, wherein the symbols are randomly arranged within the symbol matrix.

In response to detecting a trigger event (e.g. randomly and non-visibly to the player in a background process during the game play/game logic; displayed in the outcome of game play; exceeding a predefined threshold value; etc.), the method includes the step of randomly defining a range for expansion of the symbol matrix. For that purpose the respective range may be defined by the RNG which selects the respective range e.g. from a plurality of predetermined ranges for matrix expansion. This selection may be done by the RNG in a background process and may be visualized in a specific random selection process on the display device in a special display representation. The method further includes creating an expanded symbol matrix and indicating the defined or selected range for matrix expansion. The expanded symbol matrix may be a combination of the symbol matrix and a maximum possible matrix expansion. In another embodiment the expanded symbol matrix may consist of the symbol matrix expanded by the defined or selected range for matrix expansion. The method also includes the step of randomly determining an active symbol matrix area by the control unit with the help of the RNG. The active symbol matrix area is then used for the determination of an outcome of at least one consecutive game play. The active symbol matrix area's upper limit lies within the defined or selected range for matrix expansion and only equals the upper limit of the defined or selected range for the maximum matrix expansion. Before the consecutive game play is started, the expanded symbol matrix and the different states of activity of the game components (e.g. rows, columns and symbols) are clearly displayed. The player can easily distinguish between an active, an inactive and a possibly active symbol for the next game play on the display device.

The method is offered on EGMs such as slot machines and video poker machines, but may also be deployed on other devices such as on a general purpose computing device or mobile phone in stand-alone form or connected to a network, such as the internet.

Additional aspects of the invention will be apparent to those skilled in the art in view of the detailed description of the embodiments, which is made with reference to the drawings. A brief description of the drawings is provided below.

DETAILED DESCRIPTION OF THE INVENTION

Figure 1:
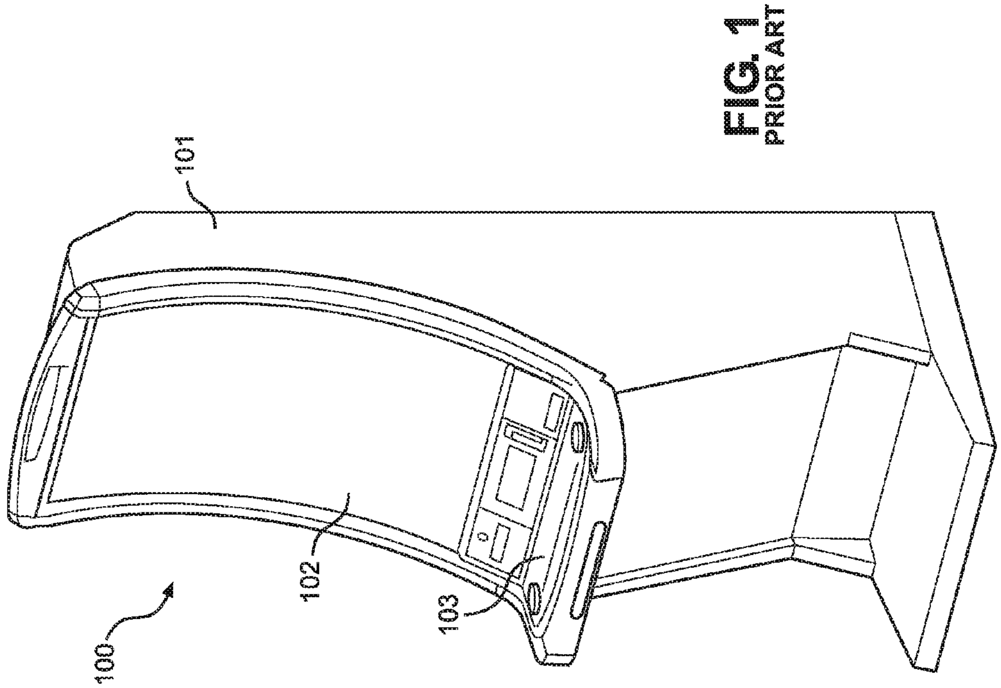
FIG. 1 PRIOR ART
FIG. 1 shows a perspective partial view of a prior art EGM.

The present invention will now be described more fully with reference to the accompanying drawings. It should be understood that the invention may be embodied in many different forms and should not be construed as limited to the embodiments set forth herein. Throughout FIGS. 1-6, like elements of the invention are referred to by the same reference numerals for consistency purposes.

FIG. 1 shows an EGM 100 in the form of a stand-alone device with a number of components. EGM 100 comprises a housing 101 whose upper half serves to accommodate a display device 102. Display device 102 may comprise a single display unit, but it may also comprise a plurality of separate display units (e.g. 2 or 3 display units), which are capable of independent functionality. Display unit 102 may be, for example, a curved LCD-TFT display unit. Housing 101 of EGM 100 has a window-like cutout in its front side for mounting display device 102 or the display unit. The window-like cutout defines the game play display region in which game contents (e.g. game play and resulting outcomes), game information (e.g. game instructions, pay tables, etc.) and, if appropriate, additional information are displayed on display unit 102.

EGM provides an input device area or an input panel section 103 which may be projected towards the player. Input panel section 103 extends over the entire width of housing 101 of EGM 100. Input panel section 103 may comprise a plurality of manually operable control keys e.g.

in the form of push-button switches. Input panel section 103 may also comprise units for inputting and/or outputting money or play credits which may be embodied in different forms—for example as a coin module, a paper money module such as a bill acceptor also referred to as a bill validator, as a module for tokens and/or as a ticket-in, ticket-out ("TITO") component with capabilities that require a ticket reader and a ticket printer housed inside EGM 100 for accepting bar coded credits printed on a ticket and for which the value of the credits is displayed on meters upon a ticket being inserted. Such devices are well known for use in EGMs and will be referred to collectively as "bill acceptors." In addition, the input panel section 103 may have a starting key as well as a handle and a plurality of control keys for the player—for example for increasing the game stake, for placing wagers, for retrieving game information or for controlling game functions.

In a preferred embodiment of EGM 100, a single continuous touch panel is arranged in front of display unit 102—which covers the display unit 102 in its entirety or in part. The touch panel covering to display unit 102 may also serve as an input device. The touch panel may be used to initiate game plays and control the game operation. The keys of input panel section 103 on the exterior of EGM 100, as well as the touch panel covering display unit 102 may be used to initiate and to control the EGM 100 by the player.

The game plays displayed on display device 102 are controlled by an electronic control unit; preferably the control unit comprises a processor and a memory for e.g. storing game instructions, game logic, etc. The control unit is accommodated in the interior of housing 101. The control unit executes instructions or the game logic that include operation of an RNG. The RNG is usually implemented in software and stored in the memory. Game outcomes are usually determined based on the results corresponding to the numbers selected by the RNG. Further, the control unit is in operative communication with display device 102 and with input device 103 or its control keys. The control unit may also process a player's inputs entered via the touch panel. In addition, the control unit actuates the bill acceptor and controls overall operation of the EGM and game play, in which a plurality of symbols positioned in a symbol matrix—as shown in FIG. 2—are displayed on display device 102 as a randomly defined game outcome.

Figure 2:
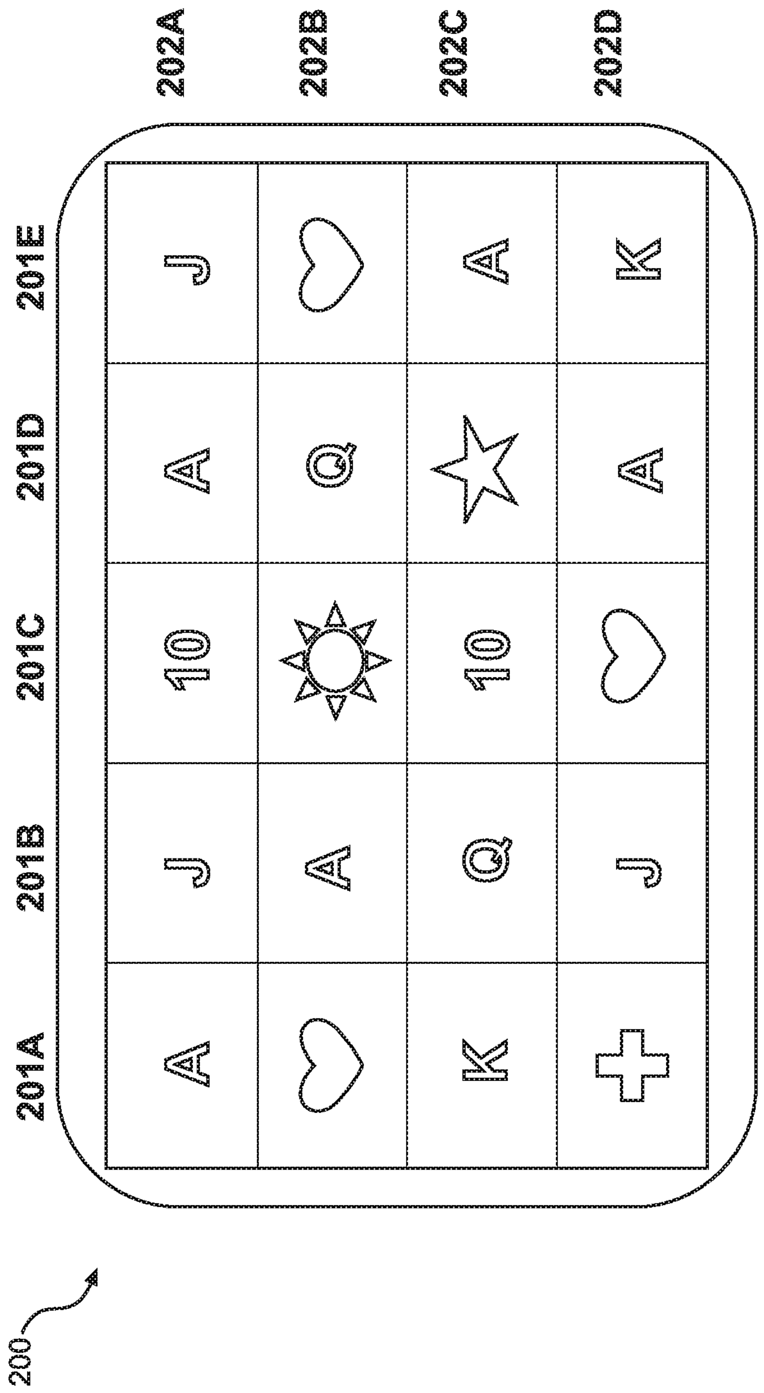
FIG. 2 is an image of an exemplary symbol matrix of a game displayed on an EGM.

Referring now to FIG. 2, there is illustrated an exemplary symbol matrix 200 which is displayed on display device 102. The display of symbol matrix 200 is typically shown in the lower part of display device 102 during game play. Above symbol matrix 200 other information may be displayed on display device 102—e.g. pay tables, game instructions, information on game features and/or triggers for game features, etc. (not shown). Below symbol matrix 200 there may be one or more game-session credit meters displayed (not shown) and various touch screen buttons (not shown) adapted to be actuated by the player. A player can operate or interact with the game as required using these touch screen buttons or other input devices like input device panel 103 and the control keys shown in FIG. 1.

The symbol matrix 200 consists of a number of rows 202A, 202B, 202C, 202D and columns 201A, 201B, 201C, 201D, 201E, wherein the columns 201A, 201B, 201C, 201D, 201E represent simulated video reels. Alternatively or additionally, the columns 201A, 201B, 201C, 201D, 201E of the symbol matrix may be a plurality of mechanical reels, or other mechanical or video representation consistent with the game format and theme. The symbol matrix 200 shown in FIG. 2 is formatted with five columns 201A, 201B, 201C, 201D, 201E—representing five reels—and four rows 202A, 202B, 202C, 202D. However, it should be understood that any sized symbol matrix of columns and rows used on a set of reels would be suitable for implementing the invention.

In response to an input of the player, the reels represented by columns 201A, 201B, 201C, 201D, 201E of the symbol matrix are rotated and stopped to place a plurality of symbols in the positions of the symbol matrix. The symbols are arranged randomly in the positions of the symbol matrix and represent the outcome of a game play, especially a basic-game play. The outcome is evaluated; e.g. if the displayed symbols forms any winning combinations according to the respective game rules, the player is awarded a prize (e.g. credits, etc.).

Figure 3:
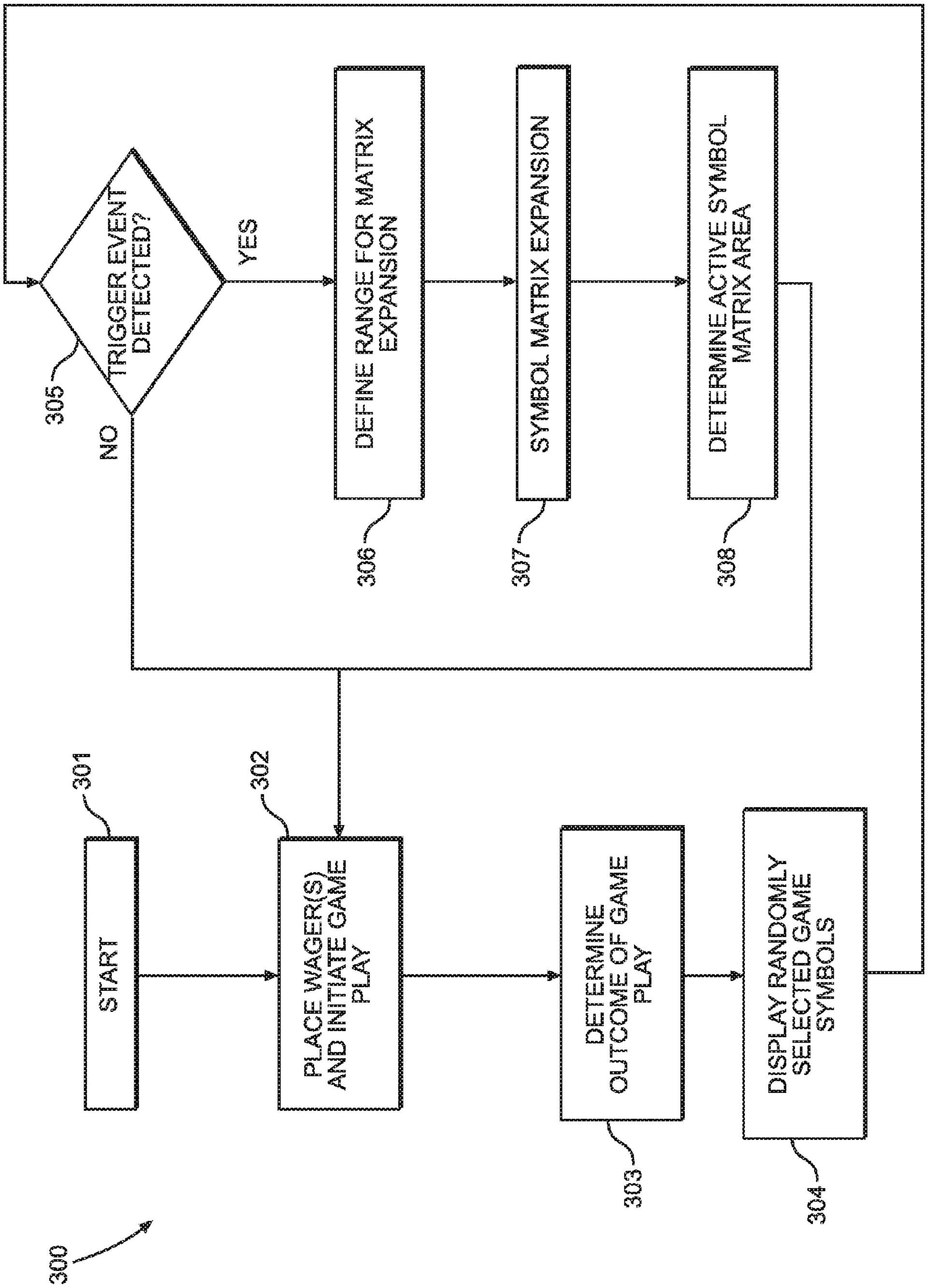
FIG. 3 shows a flow chart of game play with an expansion of the symbol matrix.

FIG. 3 shows a flow chart 300 of a play sequence including an expansion of the symbol matrix. The basic game play may use a group of reels or a symbol matrix as shown in FIG. 2 which is displayed on a display device 102—preferably a video display or touchscreen video display with a large curved display as shown in FIG. 1. The description of the operation of the game play will be provided with reference to the flowchart of FIG. 3 as well as with reference to FIG. 4 and the screenshots in FIGS. 5A-B and 6A-D.

The first step of game play is at start 301 which represents the point where a player sits down to play at EGM 100, for example, but it may also represent a point during a gaming session where the player initiates a new basic game play. If the player starts to play, he/she initially inserts a bill, ticket or coins into a slot through which access is gained to a bill acceptor of the EGM 100 to load credits on the EGM 100. The credits may be displayed to the player on a credit meter on display device 102. For the purpose of this description, the basic game play will be a spinning reel slot game on a video display device 102 with a large, curved display.

A wager is placed and the game is started using the buttons or control keys of input device 103 to initiate game play at a step 302. A symbol matrix 200 as shown in FIG. 2 is displayed on display device 102, in which a plurality of symbols is positioned in columns 201A, 201B, 201C, 201D, 201E—representing the reels—and rows 202A, 202B, 202C, 202D. Once game play is initiated at step 302, appropriate game graphics are shown on display device 102 such as spinning reels, which may be accompanied by corresponding game sounds from speakers on EGM 100. At step 303, the outcome of game play is determined. During step 303, an RNG provides one or more random numbers which are received by the control unit to control game play and to define the outcome of game play based on the results corresponding to the numbers selected by RNG.

Figure 4:
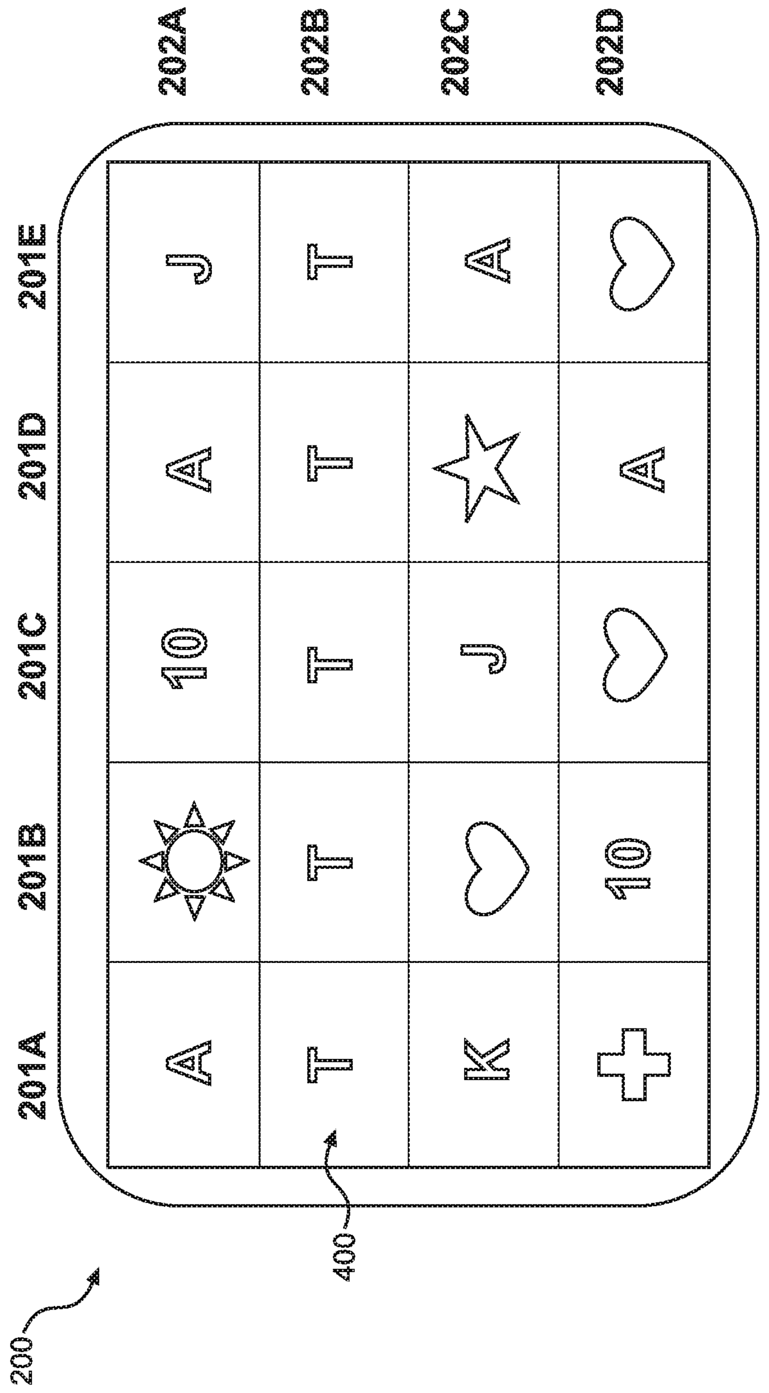
FIG. 4 shows a game symbol matrix in which an event triggers symbol matrix expansion.

Once the outcome is reached, the reels are stopped and the outcome is displayed in symbol matrix 200 as shown in FIG. 2. Symbol matrix 200 consists of positions each containing a randomly selected symbol displayed on display device 102 for the player to see at step 304. At step 305, it is determined, if a trigger event was detected either during the process of game play or in the outcome of the game. In FIG. 4 an example of a possible trigger event 400 is shown. FIG. 4 illustrates symbol matrix 200 with columns 201A, 201B, 201C, 201D, 201E and rows 202A, 202B, 202C, 202D. A plurality of symbols is displayed in the positions of symbol matrix 200 with five special symbols "T" in row 202B qualifying as a trigger event 400. The special symbol T may be a so called scatter symbol or any other special symbol having a trigger function. The special symbol T may occur as a grouping e.g. five in row as trigger event 400 (as shown in FIG. 4), but any other combination of the special symbol T may also be used as trigger 400 (e.g. a certain number of the special symbol T in row or in column, a certain number of the special symbol T in the symbol matrix). Alternative or additionally, there may be other trigger events 400, e.g. collecting a predetermined number of a special symbol T, etc. in a single game or in a predefined number of games.

In another embodiment, the trigger event may be only a software-implemented trigger, which occurs randomly during game operation by the control unit (e.g. with the help of the RNG). The occurrence of the trigger event may be detected by the control unit during the process of a game play, but the trigger event itself is not made visible to the player. A feature like an expansion of the symbol matrix triggered by that trigger event may appear as a kind of mystery feature. In this embodiment, only the start of the feature may be announced to the player on display device 102, but the trigger event itself may be hidden.

If no trigger event 400 occurs during the game play sequence or is detected by the control unit in the symbol matrix 200, possible winning outcomes are determined and the game play ends at step 305. In that case, the player is returned to step 302 to place a wager and initiate game play again, if desired. If a trigger event 400 occurs or is detected by the control unit or is detected in the symbol matrix 200 at step 305 and as shown in FIG. 4, then game play proceeds at step 306—starting the process of expanding symbol matrix 200.

At step 306, in response to detected trigger event 400, a range of random matrix expansion possibilities of symbol matrix 200 is defined. The range for matrix expansion may be any range of rows, columns or both—with an upper limit being lower or equal to a predetermined maximum expansion area which may define the maximum number of rows or columns or both to be added to the symbol matrix 200. Alternatively or additionally, the range for matrix expansion may be selected from a predetermined number of matrix expansion possibilities. The range for matrix expansion is determined by the RNG which selects the respective range in a specific random selection process controlled and executed by the control unit. The probability for each selectable range for matrix expansion may be either equal or pre-weighted by the respective game instructions which are executed by the control unit. The specific random selection process may be a background process executed and operated by the control unit or it may be displayed to the player.

Figure 5B:
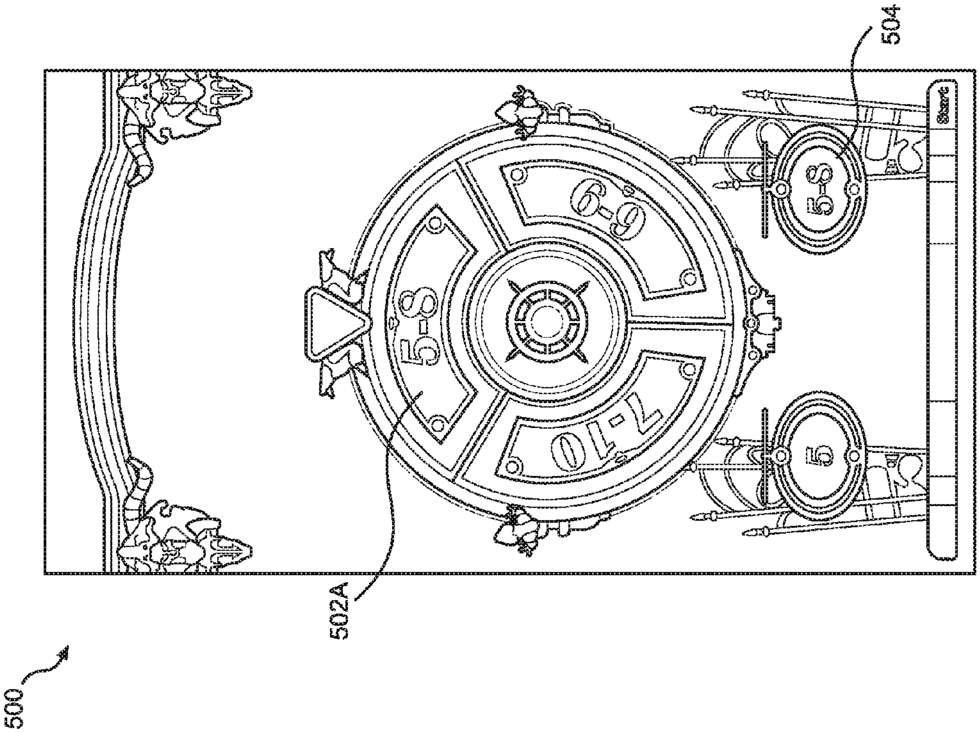
FIGS. 5A-B show illustrative screen shots of a game play sequence in which the range of symbol matrix expansion is determined.
Figure 5A:
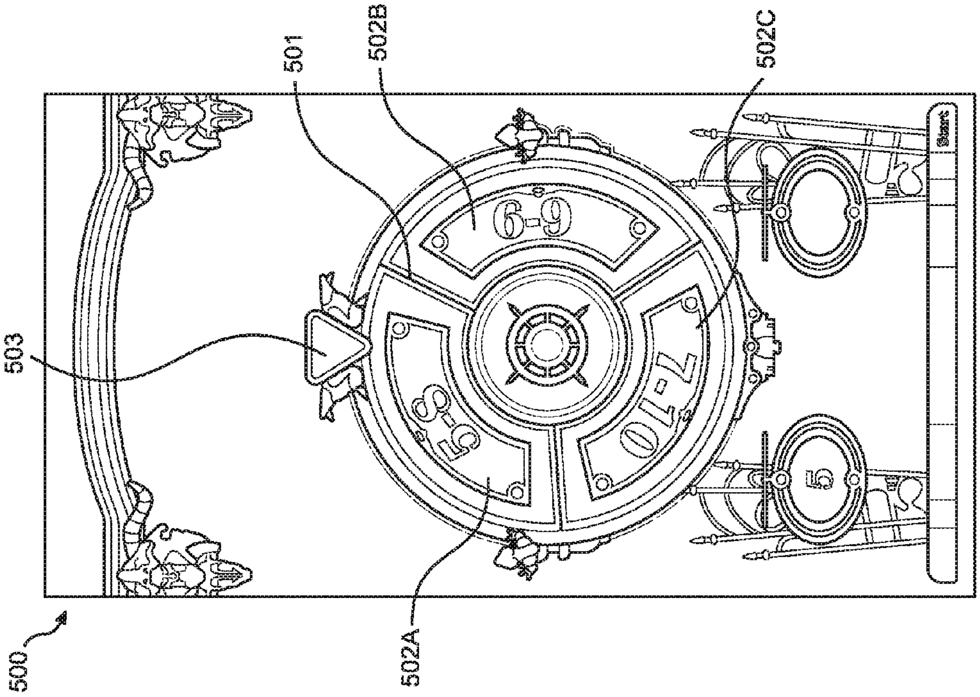

As shown in FIGS. 5A-B, the specific random selection process of the range of possible matrix expansion possibilities may be displayed in a special graphic representation 500 or special display representation 500 on display device 102 to the player. The visual representation of the specific random selection process may be conducted with the help of a wheel 501, for example, but any other representation of a selection may also be used—e.g. a moving belt, turning extra reel, temperature gauge, etc. Wheel 501 as shown in FIG. 5A has three sectors 502A, 502B, 502C from which a selection is made. Each sector 502A, 502B, 502C shown in FIG. 5A represents an area of expansion range possibilities of symbol matrix 200 or of an extended symbol matrix. It should be understood that more or fewer sections could be used. In FIG. 5A a first sector 502A represents a range of row five to eight, a second sector 502B represents a range of row six to nine and a third sector represents a range of row seven to ten, for example. Alternatively or additionally, more sectors for selection may be defined and the selection process is not limited to ranges of rows for an expanded symbol matrix. It is also possible to define ranges of columns or ranges of rows and columns. The wheel 501 has also an indicator 503 to mark a selected sector 502A, 502B, 502C after the specific random selection process has been executed.

Wheel 501 is turned for the selection of a specific range for matrix expansion. The outcome of the specific random selection process is determined by the RNG in the background and displayed after wheel 501 has stopped—as shown in FIG. 5B. Indicator 503 defines the selected sector—which in the case of FIG. 5B is the first sector 502A defining a range of rows five to eight for matrix expansion. Additionally, the outcome of the specific random selection process may be displayed to the player in a display plate 504.

The specific random selection process for defining the range for matrix expansion may be coupled with selection processes of parameters for game play (e.g. number of bonus games or free games, etc.). For example, a number of free games or bonus games may be determined in a first random selection process and then in a second random selection process the range for matrix expansion is selected. The selected range for matrix expansion may be used for the determined number of free games or bonus games. If a wheel representation for both selection processes is used, the wheel may consist of two wheels—e.g. an outer wheel for the first selection process (e.g. number of free games) and an inner wheel for the second selection process (e.g. range for matrix expansion). After the first selection process or the number of free games has been determined, there may be a transition from the outer wheel to the inner wheel, in which the inner wheel is enlarged and the outer wheel disappears—supported by graphical effects on display device 102 to increase the player's excitement and entertainment.

Figure 6B:
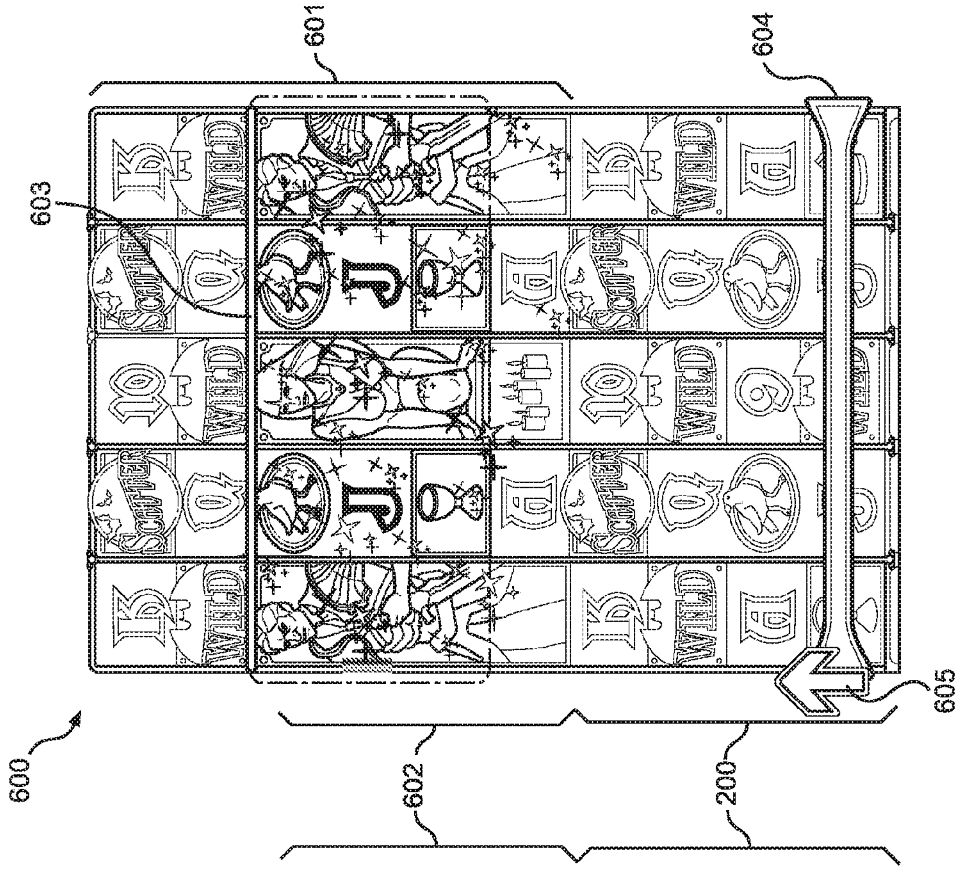
FIGS. 6A-D show illustrative screen shots of an alternative game play sequence showing an expansion process of the symbol matrix.
Figure 6A:
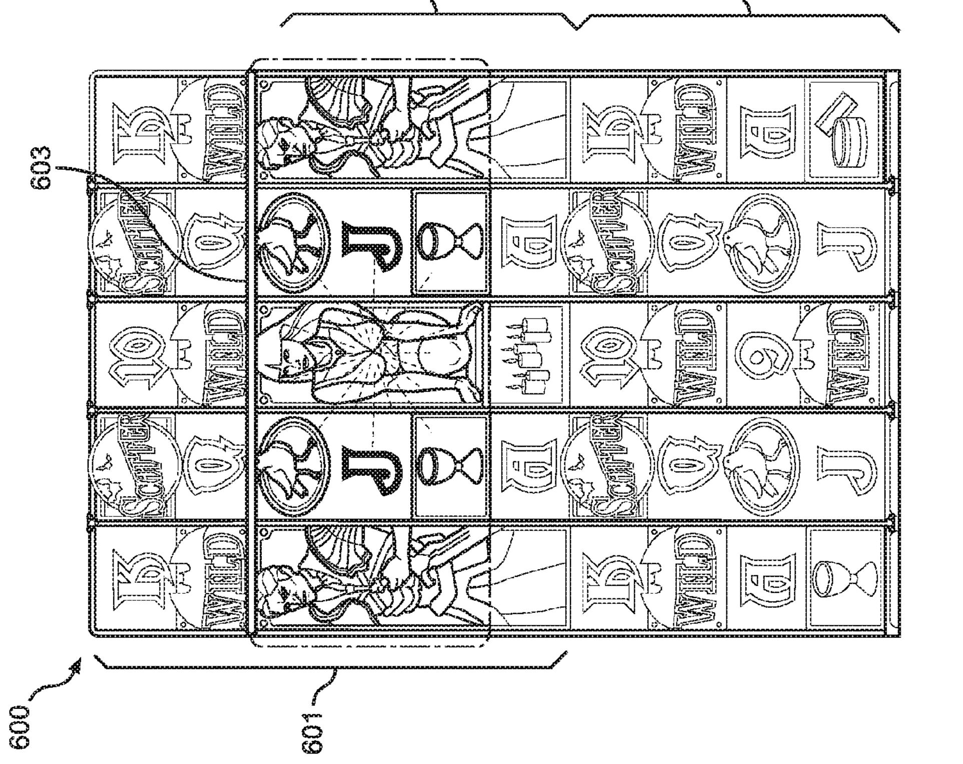

At step 307 of FIG. 3, an expanded symbol matrix 600—as shown in FIGS. 6A-D—is created and displayed on display device 102. The defined or selected range for matrix expansion 602 is indicated in the expanded symbol matrix 600 on display device 102. The expanded symbol matrix 600 shown in FIG. 6A consists of symbol matrix 200 to which a maximum matrix expansion area 601 is added. The expansion of symbol matrix 200 is done vertically by adding rows in this specific embodiment of the invention. As shown in FIG. 6A, six rows may be added as maximum matrix expansion area 601 for example. Expanded symbol matrix 600 thus illustrates the maximum possible active symbol matrix which may be achieved for a game play, if a respective range of matrix expansion (e.g. row seven to ten) was randomly selected in the specific random selection process. Since the selected range of matrix expansion in this specific embodiment of the invention is only row five to eight (as shown in FIG. 5A-B), this range 602 is marked in the expanded matrix in FIG. 6A to indicate a possible active symbol matrix area to the player. A line indicator 603 indicates the maximum number of possible rows within the selected range 602. Below the line are eight rows, which is the highest value of the five to eight range selected in step 306 of FIG. 3.

In another embodiment, the expanded symbol matrix 600 may only consist of the symbol matrix 200 used in a basic game play and the range for matrix expansion 602, which was selected or defined in the specific selection process. Expanded symbol matrix 600 then indicates the possible active symbol area to the player.

In another embodiment of the invention, the expansion of the symbol matrix 200 may be a horizontal expansion—by adding a number of columns or reels. In this case, the expansion range may be added on the right side, on the left side, on both sides or in between existing columns of symbol matrix 200. The defined range for matrix expansion may be marked graphically using highlighting or by displaying a line—e.g. as shown in FIG. 6A for adding rows. In another embodiment of the invention, the expansion of symbol matrix 200 may add an expansion area consisting of both rows and columns. The expansion of the symbol matrix 200 may be diagonal—if the rows and columns are added e.g. on the upper and right side or the lower and left side, etc. The expansion of the symbol matrix 200 may be adding rows and columns on all of its sides, as well. In any case, a defined or selected range for matrix expansion may be indicated to the player to mark a possible active symbol matrix area the player may achieve for at least one consecutive game play.

At step 308 in FIG. 3, an active symbol matrix area is determined randomly with the use of the RNG. The determined active symbol matrix area is used for at least one consecutive game and may be randomly changed after that consecutive game has been played, especially if the defined range for matrix expansion was selected for more than one game. It is preferred that the active symbol matrix area is larger than symbol matrix 200. The upper limit of the active symbol matrix area lies within the selected range for matrix expansion 602 as selected at step 306, and it does not exceed the maximum limit indicated by indicator 603 and defined by the selected range for matrix expansion 602 on wheel 501. The probability for determining a particular active symbol matrix area for e.g. the next game play may be either equal or pre-weighted by the respective game instructions which are executed by the control unit.

Figure 6D:
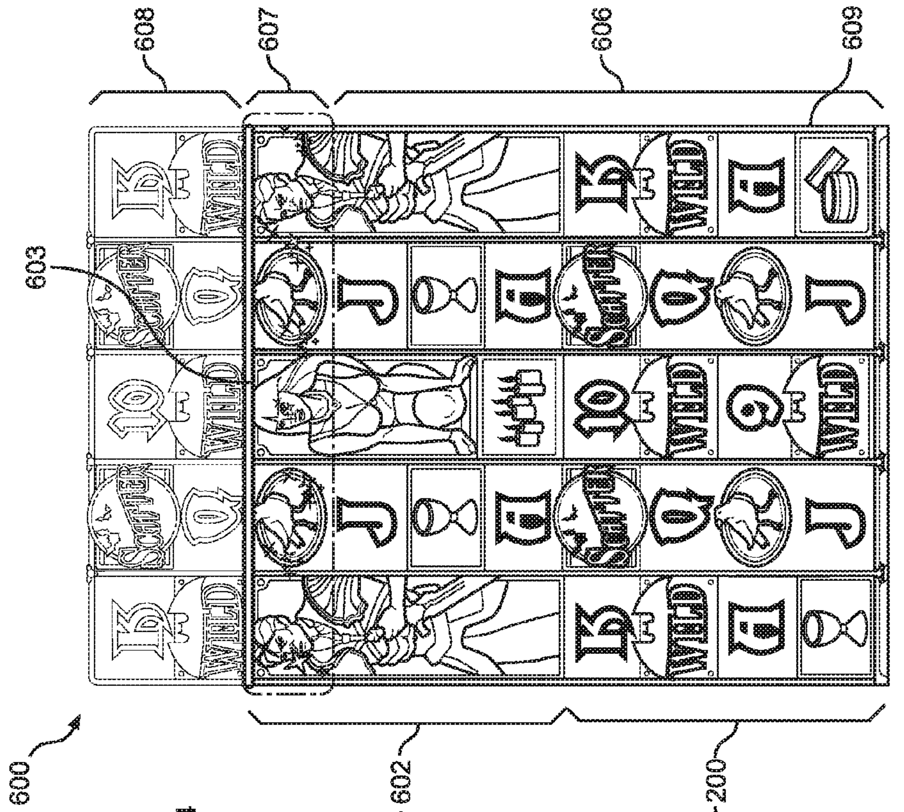
Figure 6C:
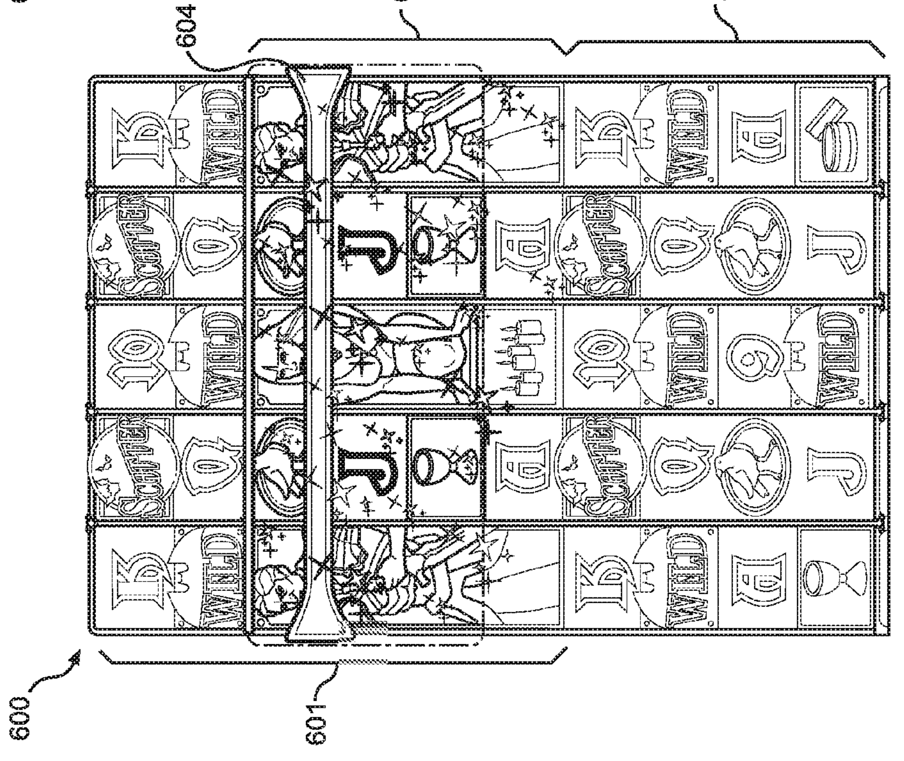

FIGS. 6B-D show screen shots of an alternative game play sequence showing an expansion process of symbol matrix 200 and a determination of an active symbol matrix area. FIG. 6B shows the expanded symbol matrix 600 with the marked range for matrix expansion 602—the marking may be done by using special graphical effects, highlighting, indicators on the respective sides of the expanded symbol matrix 600, etc. To show the determination of the active symbol matrix area, an indicator 604—e.g. a moving line, a meter on the side of expanded symbol matrix 600, etc.—may be used. In this specific embodiment of the invention as shown in FIG. 6B, a line indicator 604 moves up in the direction of arrow 605. In FIG. 6C the line indicator 604 moves until movement is stopped at the proper position for the number of expanded places based on the determination process of the active symbol area in step 306.

FIG. 6D shows expanded symbol matrix 600 after the determination of the active symbol area 606 in this specific embodiment of the invention. Active symbol area 606 is shown in color, to give the player a clear indication of the number of rows to be played in the next game play. An area 607 of the expanded symbol matrix 600 between active symbol matrix area 606 and line indicator 603, which indicates the maximum number of rows within the selected range 602, shows the area of the expanded symbol matrix 600, which might possibly be chosen as part of active symbol matrix area 606 in a next determination process using the same range for matrix expansion 602. This area 607 may be specially marked or high-lighted, to indicate possibly active areas to the player on display device 102. An area 608 above the line indicator 603 of the expanded symbol matrix 600—if the maximum matrix expansion area 601 is displayed—may be marked as inactive area. For example, area 608 of the expanded symbol matrix 600 may be colored in grey—to show that this area 608 is out of the defined or selected range for matrix expansion 602. Alternatively or additionally, the determined active symbol matrix area 606 may be marked with at least one meter 609 e.g. on the left hand side or on the right hand side or on both sides of the expanded symbol matrix 600. The meter 609 shows the number of rows that are active. The height 608 of the meter may be set to the respective row of the active symbol matrix area 606 after the current determination process.

After the active symbol area 606 is determined and displayed to the player on display device 102, the player can place wagers and initiate the next game play. In this game play the active symbol matrix area 606 is used for arranging symbols randomly and for determining the outcome as well as any winning combination(s). The use of an expanded symbol matrix 600 may be also used in a bonus round—just for one game play—that is triggered by a trigger event 400 in a basic game play. In an alternative implementation, the symbol matrix expansion and the expanded symbol matrix 600 may be used for a number of consecutive game plays (e.g. number of bonus game/free games, etc.). In case a number of consecutive games are played with expanded symbol matrix 600, the defined or selected range for matrix expansion may be determined for the whole number of game plays, before the first game is initiated. Active symbol matrix area 606 may be determined independently before each game for the number of game plays, wherein the upper limit of the selected range for matrix expansion 602 defines the possible maximum expansion of the active symbol matrix area 606 for the whole number of game plays. Alternatively, the range of matrix expansion 602 and active symbol matrix area 606 may be determined to be the same for all games of a number of consecutive game plays.

It should be understood that the matrix expansion process and the respective game play as described and shown in FIGS. 3-6 is illustrative only. It is possible to expand symbol matrix 200 in different ways. For example, as already mentioned an expansion of symbol matrix 200 with columns or with rows and columns may also be possible to provide a variety of possible expanded symbol matrices 600 as well as a variety of possible active symbol matrix areas 606—both increasing entertainment and excitement for the players.

While the invention has been described with respect to the figures, it will be appreciated that many modifications and changes may be made by those skilled in the art without departing from the spirit of the invention. For example, the game may be implemented as a free play game, in which it is not necessary to place a wager. Any variation and derivation from the above description and drawings are included in the scope of the present invention as defined by the claims.

What is claimed is:

1. An electronic gaming machine ("EGM") on which a player plays a game, the game including a symbol matrix with a predefined number of columns and a predefined number of rows in each column, comprising at least:

a display device configured to display a sequence of game play with the symbols arranged in the symbol matrix as game outcomes;

an input device configured to receive input from a player to initiate game play;

a random number generator ("RNG") for generating random numbers that determine an outcome of a game and that correspond to a predefined set of outcomes including winning and losing outcomes;

a control unit in operative communication with the display device, the input device and the RNG, and configured to control game play to provide a plurality of symbols positioned in the symbol matrix, the control unit operable to:

initiate game play in response to player input via the input device;

randomly determine an outcome of the game play using numbers generated by the RNG;

direct the display device to display the outcome of the game play in the symbol matrix, wherein symbols are randomly arranged within the symbol matrix;

in response to detecting a trigger event, randomly define a range for expanding the symbol matrix by increasing the number of positions in the symbol matrix, thereby selecting a defined range of matrix expansion;

create an expanded symbol matrix and indicating the defined range of matrix expansion on the display device;

randomly determine an active symbol matrix area with the defined range of matrix expansion wherein the active symbol matrix area is smaller or equal in size to the defined range of matrix expansion; and using the expanded symbol matrix for at least one consecutive game play including a next play of the game.

2. The EGM of claim 1, wherein the control unit is further configured to define the range for matrix expansion in a random selection process triggered by the trigger event and displayed on the display device.

3. The EGM of claim 2, wherein the control unit is further configured to direct the display device to display an expanded symbol matrix consisting of the symbol matrix and the added range of matrix expansion defined by the random selection process.

4. The EGM of claim 2, wherein the control unit is further configured to direct the display device to display an expanded symbol matrix consisting of the symbol matrix and a maximum matrix expansion area, wherein the symbol matrix and the range for matrix expansion defined in the random selection process are indicated in the expanded symbol matrix.

5. The EGM of claim 1, wherein the control unit is further configured to indicate one or more of a group of actions on the symbol matrix, comprising: (a) the determined active symbol matrix area; (b) possible active areas; and (c) inactive areas of the expanded symbol matrix.

6. The EGM of claim 1, wherein the control unit is further configured to define the range for matrix expansion as one or more from the group comprising: (a) at least one extra row; (b) at least one extra column; or (c) both (a) and (b).

7. The EGM of claim 1, wherein the control unit is further configured to define the range for matrix expansion for a number of consecutive game plays as a randomly defined number of bonus games or free games.

8. The EGM of claim 1, wherein the control unit is further configured to randomly change the determined active symbol matrix area for each game play, in which the expanded symbol matrix is used.

9. The EGM of claim 1, wherein the control unit is further configured to select the range for matrix expansion with equal or pre-weighted probability from a predefined number of possible ranges for matrix expansion.

10. The EGM of claim 1, wherein the control unit is further configured to determine the active symbol matrix area for at least one play with equal or pre-weighted probability.

11. A method of playing a game on an electronic gaming machine ("EGM") having a display device configured to display a sequence of game play with symbols arranged in a symbol matrix with a predefined number of columns and a predefined number of rows in each column, an input device configured to receive input from a player to initiate game play, a random number generator ("RNG") for generating random numbers that determine an outcome of a game and that correspond to a predefined set of outcomes including winning and losing outcomes, and a control unit in operative communication with the display device, the input device, and the RNG, the control unit controlling game play to provide a plurality of symbols positioned in the symbol matrix, the method comprising:

initiating game play in response to player input via the input device;

randomly determining an outcome of the game play using numbers generated by the RNG;

displaying on the display device the outcome of the game play in the symbol matrix, wherein the symbols are randomly arranged within the symbol matrix;

randomly defining, by the control unit, a range for expanding the symbol matrix by increasing the number of positions in the symbol matrix, in response to detecting a trigger event, thereby selecting a defined range of matrix expansion;

creating an expanded symbol matrix and indicating the defined range of matrix expansion on the display device;

randomly determining, by the control unit, an active symbol matrix area with the defined range of matrix expansion wherein the active symbol matrix area is smaller or equal in size to the defined range of matrix expansion; and using the expanded symbol matrix for at least one consecutive game play including a next play of the game.

12. The method of claim 11, further comprising defining, by the control unit, the range of matrix expansion in a random selection process triggered by the trigger event and displayed on the display device.

13. The method of claim 12, further comprising:

displaying the expanded symbol matrix consisting of the symbol matrix and the range of matrix expansion defined by the random selection process on the display device; and indicating the determined active symbol matrix area and the inactive areas of the expanded symbol matrix on the display device.

14. The method of claim 12, further comprising:

displaying an expanded symbol matrix consisting of the symbol matrix and a maximum matrix expansion area on the display device;

indicating the range of matrix expansion defined in the random selection process in the displayed expanded symbol matrix; and indicating the determined active symbol matrix area, possibly active areas and inactive areas of the expanded symbol matrix on the display device.

15. The method of claim 11, further comprising:

defining the range for matrix expansion as: (a) at least one extra row; (b) at least one extra column; or (c) both (a) and (b).

16. The method of claim 11, further comprising:

defining the range for matrix expansion for a number of consecutive game plays as a randomly defined number of bonus games or free games, before starting a first game play of the defined number of consecutive game plays.

17. The method of claim 11, further comprising:

randomly changing, by the control unit, the determined active symbol matrix area for each game play using the expanded symbol matrix.

18. The method of claim 11, further comprising:

selecting, by the control unit, the respective range for matrix expansion with equal or pre-weighted probability from a predetermined number of possible ranges for matrix expansion; and determining, by the control unit, the respective active symbol area with equal or pre-weighted probability.

* * * * *